United States Patent

Izakson

[15] 3,675,404
[45] July 11, 1972

[54] HILLSIDE COMBINE HARVESTER

[72] Inventor: Khanaan Ilich Izakson, Rostovskoi oblasti, ul. III Internatsionala, 92a, Taganrog, U.S.S.R.

[22] Filed: Jan. 6, 1970

[21] Appl. No.: 933

[52] U.S. Cl. ..................................................56/209
[51] Int. Cl. .................................................A01d 75/28
[58] Field of Search ..........................................56/208, 209

[56] References Cited

UNITED STATES PATENTS

2,796,717  6/1957  Orelind et al. ...........................56/209
2,947,134  8/1960  Clifford et al. ...........................56/209

Primary Examiner—Russell R. Kinsey
Attorney—Waters, Roditi, Schwartz & Nissen

[57] ABSTRACT

A hillside combine harvester comprising a thresher including a header consisting of an inclined body and a platform pivotably connected to the latter; the pivotable connection providing for balancing of the platform on the inclined body and controlling motion thereof so as to enable the combine to operate under a wide range of hillside harvesting conditions.

8 Claims, 15 Drawing Figures

HILLSIDE COMBINE HARVESTER

The present invention relates to a novel highly efficient hillside combine harvester for gathering cereal crops on hillsides.

When gathering crops on hillsides with the use of cutting and threshing devices, it is desirable, that the cutting device should be adapted to follow the contour of the field surface, whereas the threshing device and the cleaning mechanism operate better in case they preserve their horizontal position.

In the present art harvesters a header is commonly used which cuts the grain and delivers it to an inclined chamber directed upwards and backwards to the front portion of the combine separator.

When threshing the grain, it is desirable, that the grain be delivered into the combine separator in a uniform flow over the entire width of the separator, which favors a more complete utilization of the possibilities offered by the separator.

Known in the art are quite a number of devices, which make it possible for the threshing device and the cleaning mechanism to remain in their horizontal position when working on hillsides, while the header travels parallel to the shaft of the bearing wheels (cf. the U. S. Pat. No. 2.796.717, Cl. 56, subclass 209).

None of these devices, however, is able to ensure an effective employment of the possibilities offered by the threshing or separating device of the hillside combine harvester and provide possibilities for increasing the efficiency of the machine.

One of the main problems that remained unsolved during many years, and difficulties encountered in developing a highly efficient hillside combine harvester resided in the fact, that the mechanism of suspending the header on the inclined body of the known hillside combine harvesters based on the employment of a ring joint encompassing the inclined body imposes limitations on the dimensions of the inclined body and the width of the combine separator and, hence, restricts the possibility of improving the efficiency of the combine.

In view of the above, the width of the separator of the present art hillside combine harvesters is not over 800–900 mm and their capacity is 3 to 5 tons of grain per hour, whereas the width of the separators employed on modern level land combines reaches 1200–1500 mm, and their capacity is 10 to 12 t/hr.

Another no less important problem also faced for a number of years and connected with improving the efficiency of hillside combine harvesters resided in that in the course of travel of the grain from the header to the inclined body the grain flow shifted to the side of inclination of the header body, this resulting in the one-sided uneven loading of the threshing drum.

This phenomenon is conditioned by the fact, that in the hillside combine harvesters known heretofore the axis of the articulated connection of the header with the inclined body is disposed considerably higher than the grain flow.

A low efficiency of the machine and the lack of any means for eliminating the side shift of the grain flow in the inclined body hindered the employment of the known hillside combine harvesters on a large scale.

The third of the problems to be solved, connected with the work of hillside combine harvesters on hillsides, was to eliminate inadequate following of the field contour by the header.

In the hillside combine harvesters known heretofore the header travels parallel to the shaft or axle of the bearing wheels, since it is not provided with means for the field contour to be followed just under the header body, this being responsible for a possibility of the header dipping into the soil when working on close cuts.

Still another problem to be solved in the design of the hillside combine harvester when transmitting the rotation from the combine transmission to the working members of the header resides in that the drive members ensuring the transmission limit the value of the angle of turn of the header with respect to the body. For making the hillside combine harvester operative on hillsides with considerable incline angles, the drive of the working members of the header is to comprise a great number of articulately and telescopically interconnected elements.

In view of the above-stated, the main object of the present invention is to provide a novel highly efficient hillside combine for harvesting cereal crops on hillsides, in which the elements of the turnable connection of the header with the inclined body are disposed outside the space occupied by the inclined body and eliminate the conditions responsible for limitations otherwise imposed on the parameters of the inclined body and on the width of the separator.

Another object of the invention is to provide a hillside combine harvester of the type specified hereinabove whose turning device of the header is mounted on the inclined body and enables to eliminate the side shifting of the grain flow in the inclined body.

Still another object of the invention is to provide a hillside combine harvester of the type specified hereinabove with the header suspended on the inclined body so that the suspension is balanced on a ball joint disposed low with respect to the grain flow and with the elements of connection of the header to the shaft of the bearing wheels such that the header can follow the micro- and macrocontour of the field when in the working position and travel parallel to the axle of the bearing wheels when the combine is in the transport position.

A further object of the invention is to provide a drive for the working members of the header of the hillside combine harvester of the type specified hereinabove which will be simple in design and which will preclude any influence of the drive members on the possible range of angular travel of the header platform or table with respect to the inclined body when operating on hillsides.

In accordance with said and other objects, the present invention resides in that the header is connected with the inclined body by means of a suspension mechanism with a three-dimensional articulated connection disposed adjacent to said body.

It is expedient, that the suspension mechanism be provided with a spherical support disposed below and somewhat behind the receiving end of an inclined conveyor, as well as with means for balancing the header on the inclined body arranged on both sides of said body, and with a member adapted to limit the turn of the header in a horizontal plane. It is desirable, that the mounting of the spherical support be fixed on the header and the ball joint be fixed on the body by means of brackets.

It is also desirable, that each means for balancing the header comprise at least one resilient member whose one end should be fixed on the upper portion of the inclined body and the other end, by means of a link and a lever, be connected with the header and with the lower portion of said body.

The member limiting the turn of the header in a horizontal plane should be made as at least one roller fixed on the header and arranged in a vertical groove of a member of the inclined body.

For following the microcontour of the soil directly by the header platform the means for controlling the header from the balancing axle of the combine is made so that, when in the transport position, the header is kept parallel to the hillside, and when in the working position, the header is kept on the hillside surface.

It is expedient, that the means for controlling the header be provided with at least one bracket having a shaped groove, said bracket being fixed on the balancing axle of the wheels, and with at least one lever with a roller, said lever being fixed on the header and said roller being arranged in the shaped groove of said bracket.

With a view to extending the range of angular travel of the header on the transverse axle, the drive of its working members is made as a telescopic cardan shaft, whose one end, by means of a conical reduction gear, is connected to the driving shaft of the inclined conveyor, and the other end is connected to the power take-off shaft of the conical reduction gear fixed on the header.

Other objects and advantages of the present invention will become apparent upon consideration of a detailed description thereof, to be had in conjunction with the accompanying drawings, wherein.

Figure 1:
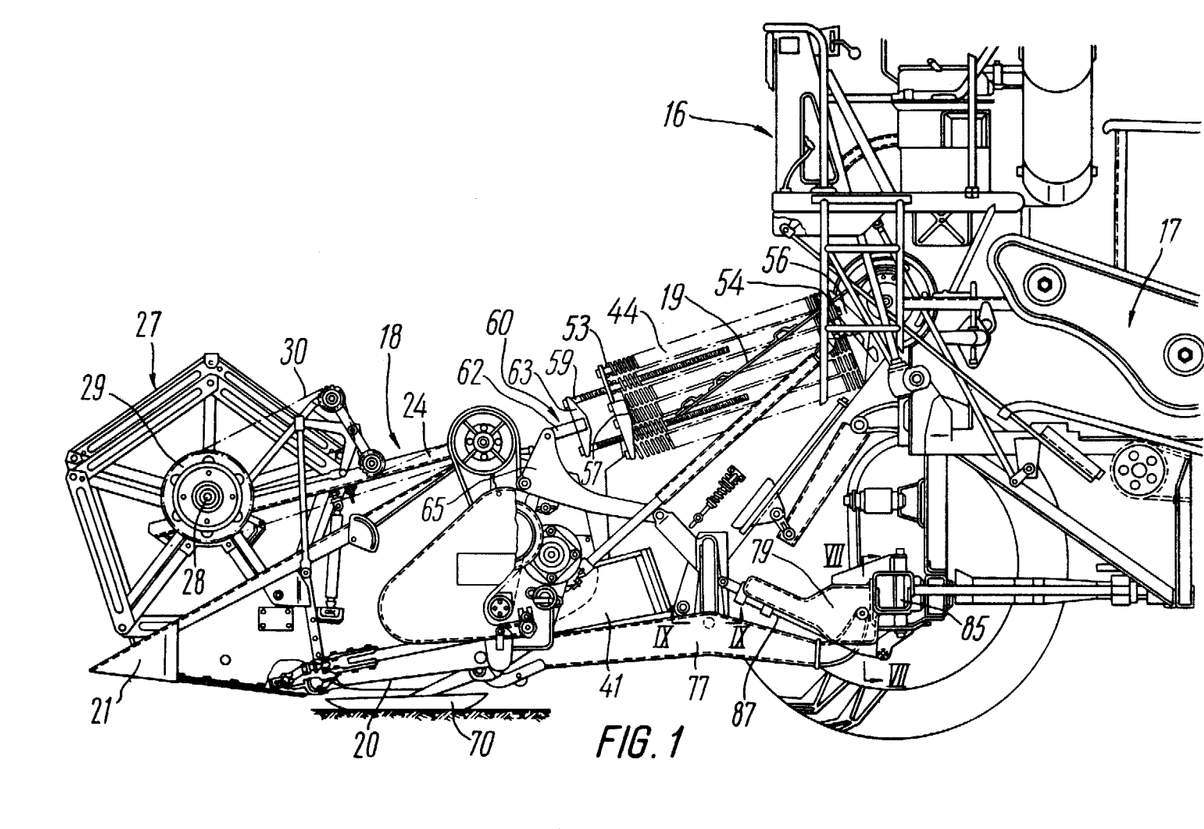
FIG. 1 is a general side view of the hillside combine harvester according to the invention with the header platform in the operative position.

Referring now to FIG. 1, indicated at 16 is a hillside combine harvester which comprises a conventional separator 17 and a header or table 18. The table 18 has an inclined body 19 articulated to the separator, and a platform 20.

Figure 3:
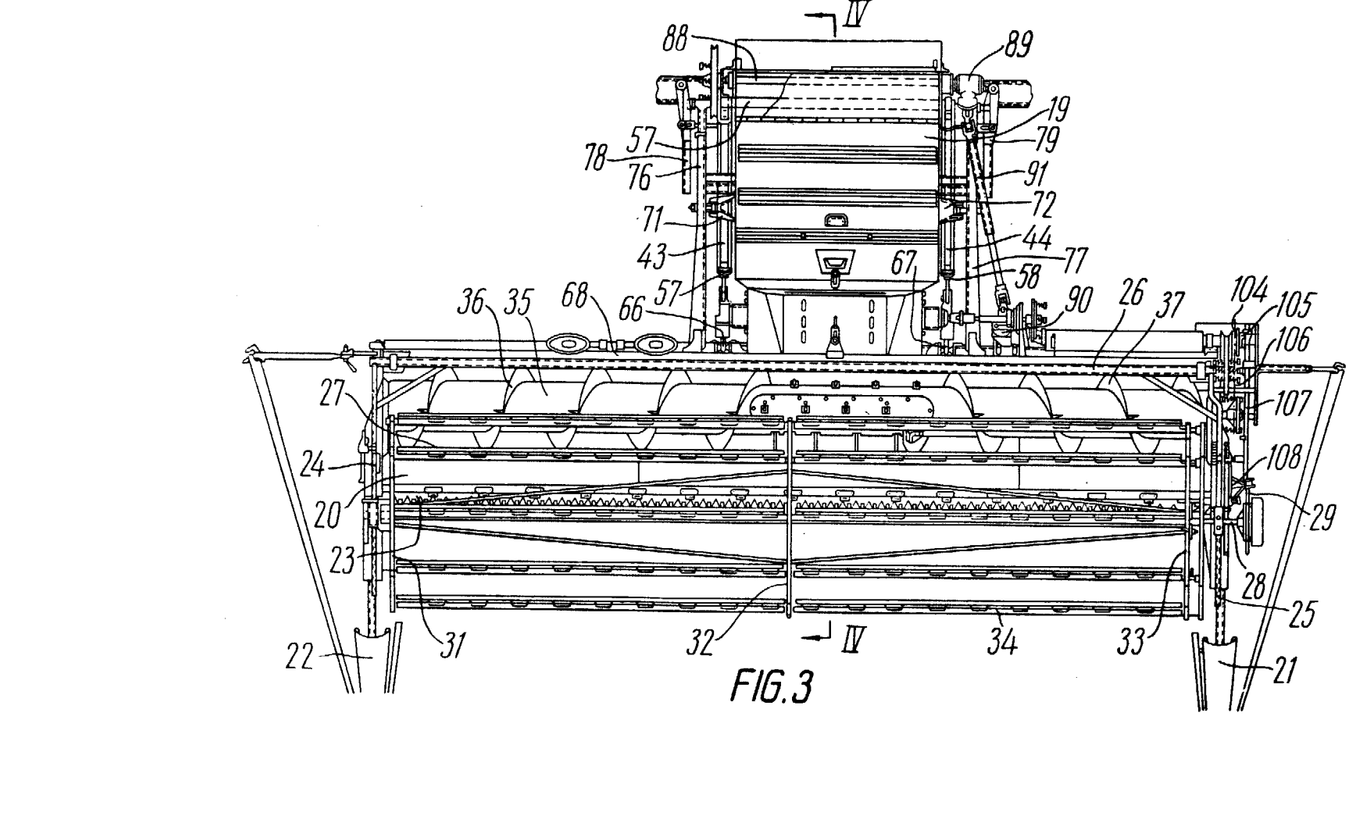
FIG. 3 is a top plan view of the table, showing the platform, the inclined body, the mechanism for suspending the platform on said body and the mechanism of the drive of the working members of the table.

The platform comprises dividers 21 and 22 and a cutterbar 23 arranged therebetween (FIG. 3). Disposed at the opposite ends of the platform 20 are supports 24 and 25 rigidly interconnected by a tubular member 26 pivotable relative to the platform 20.

Figure 2:
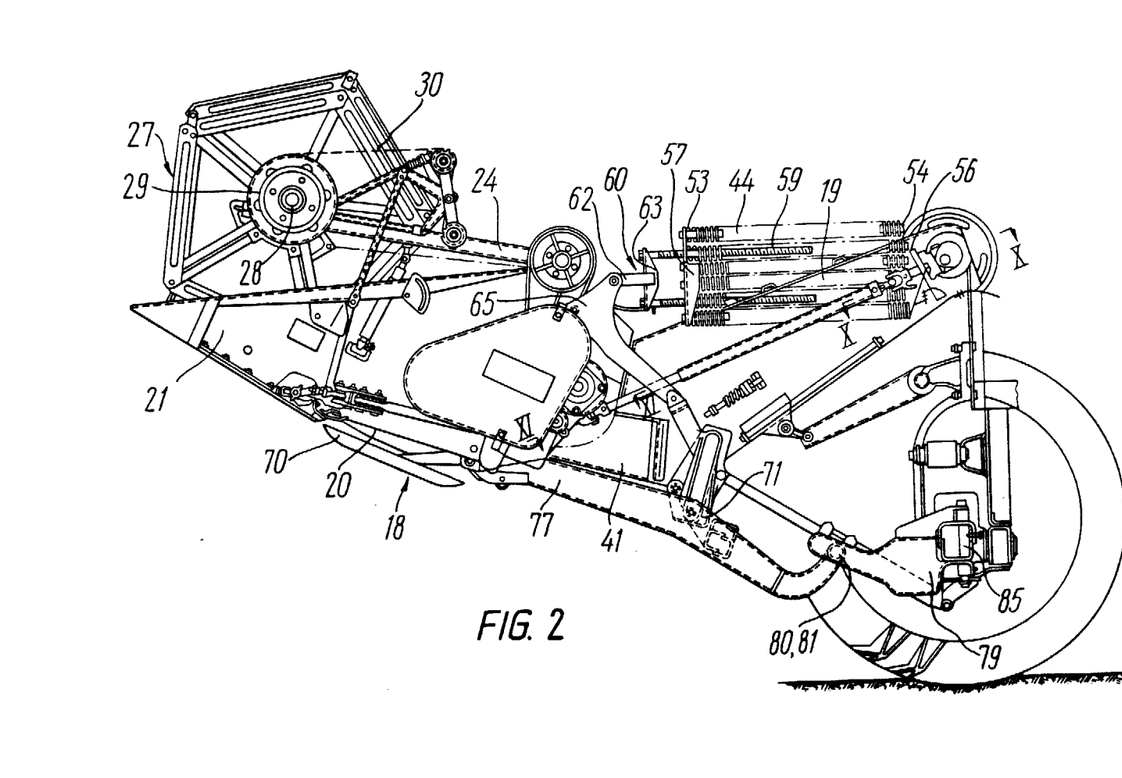
FIG. 2 is the same, but with the table platform in the inoperative position.

A reel 27 is mounted on the supports 24, 25 so that it can rotate. The reel comprises a central shaft 28, whose external end mounts a sprocket 29 of a chain drive 30 (FIG. 2). The reel 27 also comprises radially arranged spiders 31, 32, 33 (FIG. 3) whose external ends carry blades 34, the latter serving to contact the stems of the cereals being harvested and bend them down toward the cutterbar 23.

The platform 20 mounts a transverse auger 35 whose helical flights 36, 37 are directed opposite and serve to move the cut grain to the central portion of the platform 20.

Indicated at 38 is a chamber (FIG. 4) of the platform 20 directed rearwardly and accommodating a finger-type beater on feed means 39 adapted to deliver the grain to an inclined conveyor 40. Indicated at 41 is a trough-like elastic shield which overlaps the space between the platform 20 and the inclined body 19.

The cut crop from the cutterbar 23 is directed by the auger 35 and the beater 39 backwards and upwards into the inclined body 19 and then into the separator 17 (FIG. 1).

Since the machine of the invention is intended to operate on hillsides, the wheels of the machine can move vertically with respect to each other, the separating structure remaining in the horizontal position, irrespective of the slope steepness.

The present invention relates mainly to the mechanism of suspension of the table platform on the inclined body and to the means of controlling the table, as well as to the driving mechanism of the working members of the table; the present invention does not relate to the design of the separating means and of the means serving to level the combine harvester on hillsides.

Therefore, disclosed hereinbelow are only the design features of said first-mentioned mechanisms, which can be employed in combines provided with any known separating and levelling means.

Figure 4:
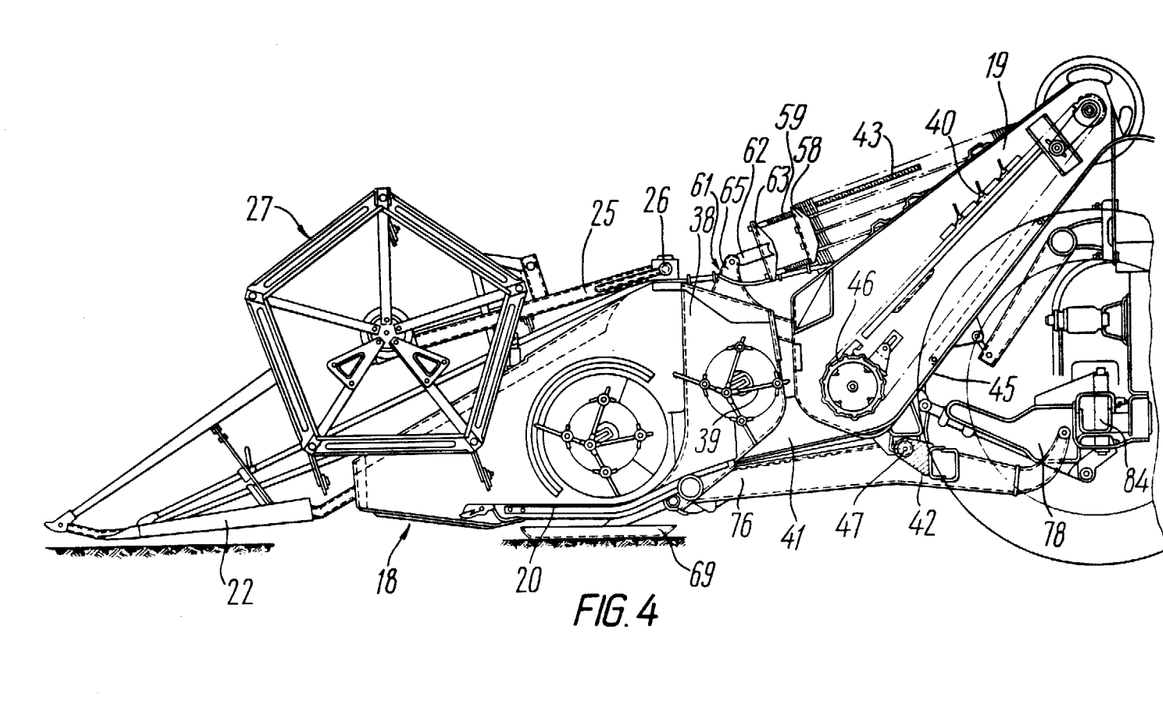
FIG. 4 is a longitudinal section of the combine harvester taken along the line IV—IV in FIG. 3.

As shown in FIG. 4, the platform 20 bears against the inclined body 19 by means of a three-dimensional articulated connection 42 and is balanced thereon with the help of two adjustable blocks of springs 43, 44 (FIG. 3) mounted on the inclined body 19 on its sides.

The three-dimensional articulated connection 42 of the table platform 20 with the inclined body 19 is disposed under the bottom 45 of the inclined body 19 below the receiving drum 46 of the inclined conveyor 40, approximately on the axis of the grain flow under said drum.

Figure 15:
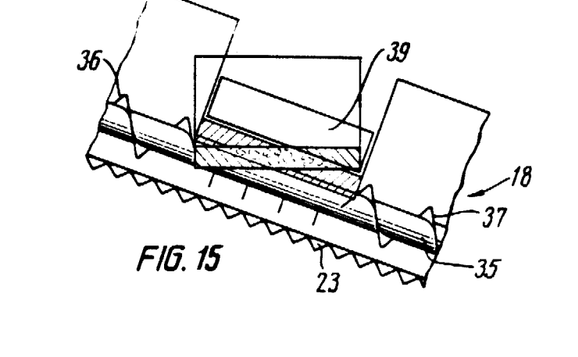
FIG. 15 shows the same in operation on hillsides.

Such an arrangement of the three-dimensional articulated connection 42 makes it possible for the grain flow running from the cutterbar 23 into the separator 17 to be introduced into the inclined body 19 without the side shift of the flow. As shown in FIG. 15, the grain flow being of a uniform width, additionally levelled by the finger beater 39 mounted on the platform 20, when moving along the elastic trough-shaped shield 41 (FIG. 4) that overlaps the space between the platform 20 and the bottom 45 of the inclined body 19, turns about its longitudinal axis following the curvature of said shield and enters said inclined body in a uniform flow over the entire width of the conveyor 40.

The right block 43 (FIG. 6) comprises four springs.

Figures 5, 6:
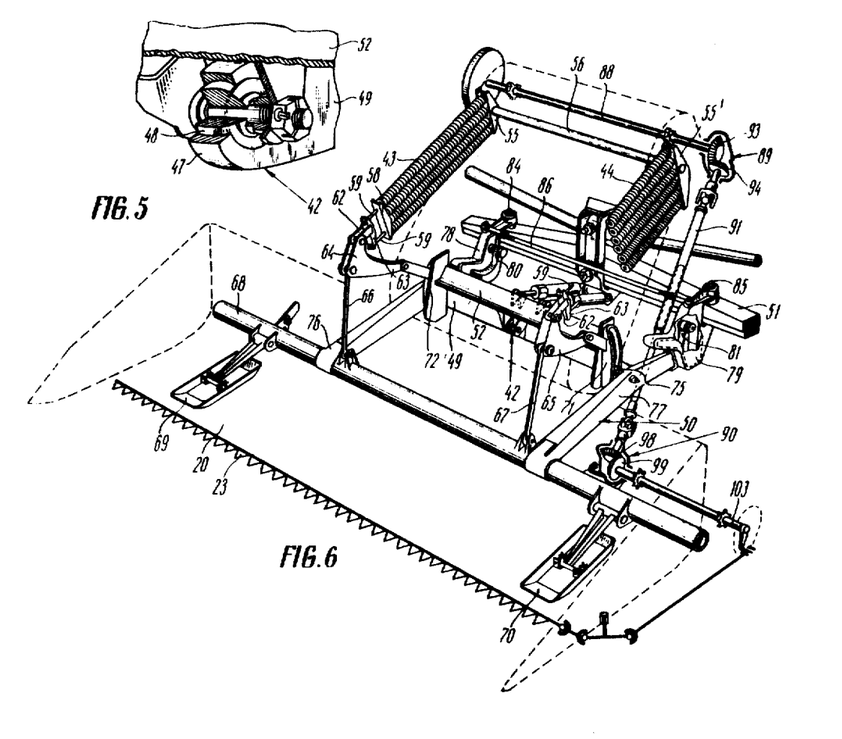
FIG. 5 shows the articulated connection of the table platform to the inclined body.
FIG. 6 is a perspective view of the suspension mechanism of the table platform, a means for controlling the table and the mechanism of the drive of the working members of the table.

The left block 44 is provided with six springs, since the left portion of the platform 20 of the table that carries all the driving mechanisms, is considerably heavier than the its right portion.

The three-dimensional articulated connection 42 is made as a central spherical joint and comprises a spherical mounting 47 (FIG. 5) and a ball support 48.

The spherical mounting 47 is fixed on a cross beam 49 of a means 50 that controls the table 18 (FIG. 6) on the balancing axle 51 of the driving wheels of the combine harvester.

The ball support 48 (FIG. 5) is mounted on a cross beam 52 of the inclined body 19.

Screwed into the springs of the balancing blocks 43, 44 on both ends of said springs are plugs 53 that are provided with male helical thread to fit the size of the spring coils.

Through central threaded openings in the plugs 53 the upper ends of the springs of each block 43, 44 are connected by means of bolts 54 with upper mountings 55,55' (FIG. 6) which are arranged on a common shaft 56.

The lower ends of the springs are fixed on lower mountings 57, 58 (FIGS. 1, 2, 4) by means of bolts similar to those fixing the upper ends of said springs, with the exception of two springs of each block which are arranged symmetrically to the axis thereof.

Said symmetrically arranged springs are fixed in the mountings 57, 58 by bolts 59 of tensioning mechanisms 60, 61, which, for each of the blocks 43, 44 of springs are made as a longitudinal rod link 62 with a transverse bearing plate 63, the bolts 59 passing through openings provided therein. The longitudinal links 62 are articulated to balancing levers 64, 65 (FIG. 6).

The levers 64, 65 are articulated to the sides of the inclined body 19 and, in turn, by means of links 66, 67, are articulated to the main beam 68 of the body of the platform 20.

The balance of the platform 20 on the inclined body 19, prerequisite for the adequate following of the field contour, is attained by adjusting by means of the bolts 59 the tension of the springs of the blocks 43, 44.

The platform 20 balanced on the inclined body 19 (FIGS. 1, 2, 4) in its working position bears against the field surface by its finder shoes 69, 70, which for obtaining different heights of cutting the stems may be made adjustable.

Adequate following of the field contour is attained when the unbalance of the platform 20 is within 30–50 kg, the pressure being measured at the guard bar of the cutterbar 23. If the platform unbalance is considerably greater, the pressure on the finder shoes 69, 70 will increase accordingly and this may result in poorer operation of the table.

Should the unbalance be smaller, the table platform will easily go up and leave the soil to the greater extent, the higher the speed of the combine travel along the field.

Consequently, the table will be unable to follow the irregularities of the field contour.

If the mechAnism of the table suspension is properly adjusted, the platform, when encountering irregularities of the field contour, will easily slide over the surface without leaving the soil. To preclude turning of the platform 20 about the spherical joint 42 in a horizontal plane, limiters 71 and 72 are provided (FIG. 6), disposed on both sides of the inclined body 19.

Figure 9:
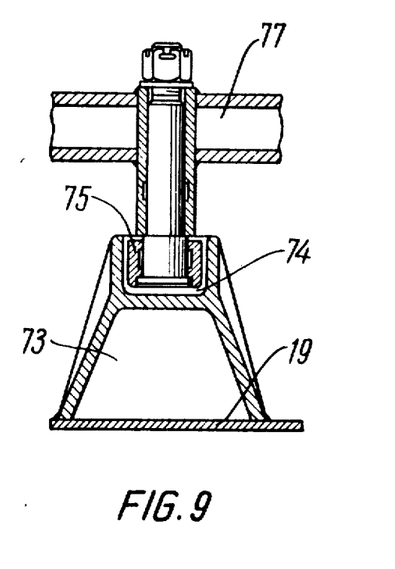
FIG. 9 is an enlarged section taken on the line IX—IX of FIG. 1 showing the elements of the member adapted to limit the turn of the table platform in a horizontal plane.

Each of the limiters 71, 72 comprises a guide 73 (FIG. 9) with a groove 74, said guide being fixed on the body 19, and a roller 75 accommodated in the groove of the guide.

The rollers 75 are fixed on longitudinal lever member 76, 77 (FIG. 6) of the means 50 controlling the table from the balancing axle 51 of the driving wheels of the combine harvester. The control means 50 comprises the above-mentioned longitudinal lever members 76, 77 which extend from the platform 20 to the balancing axle 51 and, together with the main beam 68 of the body of the platform 20 and the cross beam 52, make up a rigid frame, which is connected by the spherical joint 42 with the inclined body 19, and also two trough-like brackets 78 and 79 articulated to the balancing axle 51.

Free ends of the lever members 76, 77 mount externally arranged rollers 80, 81.

Figure 7:
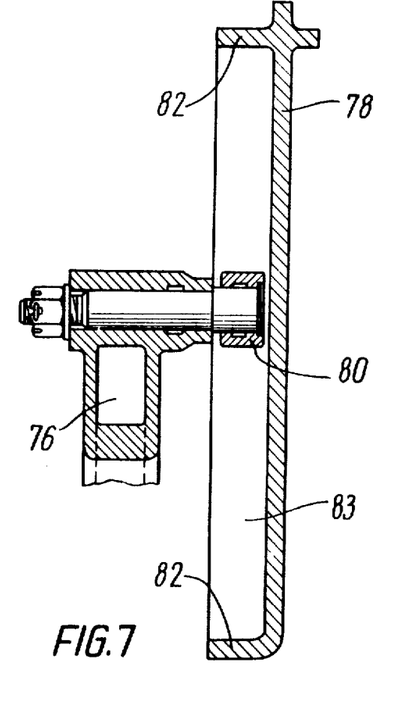
FIG. 7 is an enlarged section taken along the line VII—VII of FIG. 1 which shows the members of the means controlling the table in their mutual arrangement when the hillside combine harvester of the invention is in the working position.
Figures 8, 11:
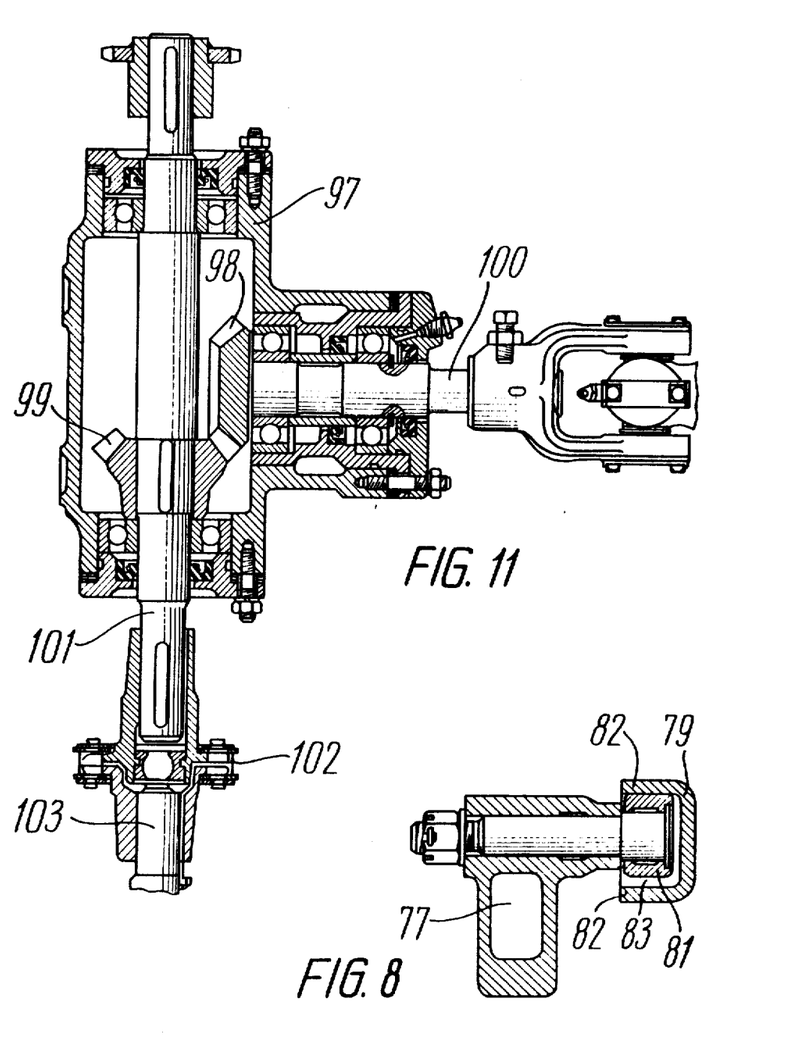
FIG. 8 shows the same, an enlarged section being taken along the line VIII—VIII of FIG. 1, the table platform being in the transport position.
FIG. 11 is an enlarged section taken along the line XI—XI of FIG. 2 which shows the members of the drive of the working members of the table and illustrates the connection between the inclined conveyor and the power take-off shaft.

The brackets 78 and 79 over their entire contour are provided with flanges 82 (FIGS. 7, 8) which define closed shaped grooves 83 of variable cross-section.

The brackets 78, 79 are mounted on axles 84, 85 (FIG. 6) on both sides of the lever members 76, 77 in such a manner, that each roller 80, 81 is located in the space defined by the respective flanges. The brackets 78, 79 are interconnected by means of a link 86.

The sizes of the grooves 83 (FIGS 7, 8) of the brackets 78, 79 are so selected, that the platform 20 (FIG. 6) following the variations in the position of the balancing axle 51, when in the transport position, should be disposed parallel to said axle, and, when in the working position, could travel with respect to the axle within the pre-set range of following the field contour.

The rollers 80, 81, when the table is in its working position, as it is shown by dotted lines in FIG. 1, are arranged in the wide portion of the grooves 83.

When the table is brought into the tansport position, which is done by means of lifting its platform with the help of power cylinders 87 (FIG. 1), said rollers move in the grooves 83 (FIGS 7, 8) away from the balancing axle 51 (FIG. 6) and are disposed in the narrow portion of said grooves, as shown in FIG. 2.

The possibility of such selective setting of the platform 20 with respect to the balancing axle 51 of the wheels of the combine is a specific advantage of the proposed combine harvester.

Figure 10:
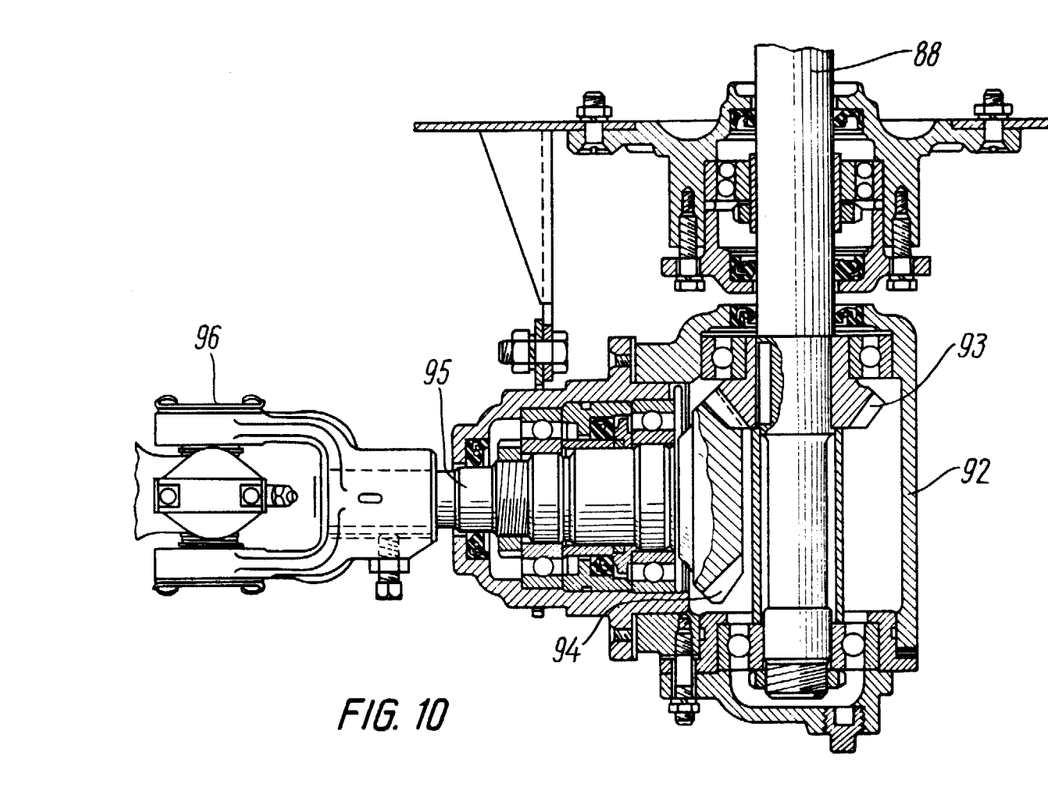
FIG. 10 is an enlarged section taken along the line X—X of FIG. 2 and showing the connection between the upper shaft of the inclined conveyor and the telescopic cardan shaft of the drive.
Figure 12:
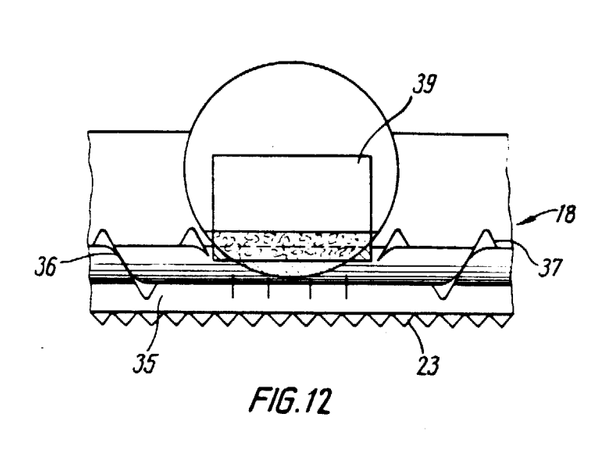
FIG. 12 is a diagram of the grain flow at the inlet of the inclined body of a conventional hillside combine harvester with a ring joint in the connection of the table platform with the inclined body; the diagram illustrates the character of the flow when the combine works on a level land.
Figure 13:
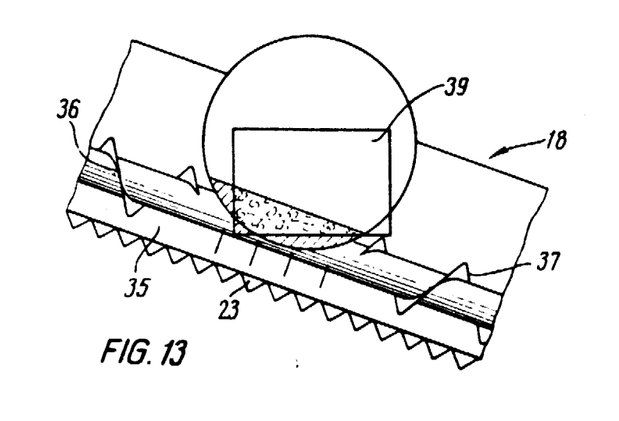
FIG. 13 is the same when the combine works on a hillside; as can be clearly seen from the drawing, the grain flow moves at one side of the receiving drum of the inclined conveyor.
Figure 14:
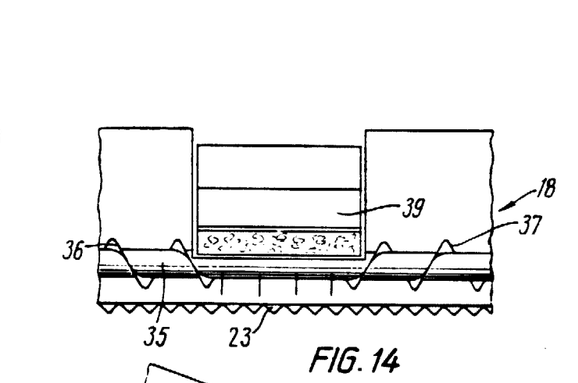
FIG. 14 is a diagram of the grain flow at the inlet of the inclined body of the proposed combine harvester when it operates on a level land.

The mechanism of the drive of the working members of the table comprises an upper shaft 88 (FIG. 3) of the inclined conveyor 40, driven by the transmission of the combine, a conical reduction gear means 89 connected with said shaft, a conical reduction gear means 90 mounted on the platform 20, and a two-joint telescopic cardan shaft 91 that interconnects said reduction gears. The reduction gear means 89 comprises a casing 92 (FIG. 10) turnably mounted on the upper shaft 88 of the inclined conveyor 40 (FIG. 3) and two meshing conical gears 93, 94 (FIG. 10). The gear 94 is made integral with an output shaft 95, whose free end is connected with a universal joint 96 of the telescopic shaft 91 (FIG. 6). The reduction gear means 90 comprises a casing 97 (FIG. 11) in which two conical gears 98 and 99 are mounted, one of which is made integral with an input shaft 100, and the other is mounted on a shaft 101. The shaft 101 by means of a chain coupling 102 is connected with a power take-off shaft 103, the external end of which mounts a sprocket 104 (FIG. 3) and a crank-up pin 105. The sprocket 104 through a chain 106 drives the auger 35 and the reel 27. The crank-up pin 105 through a link 107 and a rocker lever 108 actuates the cutterbar 23.

In the combine harvester proposed by me the parameters of the separator are made independent of the design of the turnable connection of the platform 20 of the table with the inclined body 19, which fact makes possible the creation of highly efficient hillside combine harvesters.

The arrangement of the axis of the turnable connection of the platform 20 of the table with the inclined body 19 on the axis of the grain flow under the receiving drum 46 of the inclined conveyor 40 makes it possible to eliminate lateral shifting of the grain flow in the inclined body, which is also considerably instrumental for improving the efficiency of the hillside combine harvester due to the uniform loading of its separator. Automatic following by the platform 20 of the table of irregularities in the field contour makes it possible to considerably reduce the fatigue of the combine driver, since it becomes no longer necessary for the driver to watch variations in the field contour. Moreover, the fact, that the field contour is followed directly by the platform of the table, makes it possible to perform crop harvesting with close cuts, which reduces losses of cut ears.

The mechanism of suspension of the table platform and the means for controlling the table from the balancing axle of the combine do not affect the design of the separator and of the very table, whereby it becomes possible to organize the manufacture of hillside combine harvesters on a common basis with level land combines and make them unified.

Since various changes and modifications are possible in the hillside combine harvester disclosed hereinabove, as well as various embodiments thereof within the spirit and scope of the appended claims, it should be borne in mind, that the present disclosure is only illustrative and does not limit the possibilities of the present invention.

I claim:

1. A hillside combine harvester, comprising a thresher, a plurality of rotatable wheels positioned on a balancing axle, said thresher being mounted on the balancing axle; a header connected to said thresher along a cross axis, said header comprising an inclined body and a platform, and means pivotably connecting said platform to said inclined body, said pivotable connection means comprising a compact support and elements for balancing said platform on the inclined body.

2. A hillside combine harvester, comprising a thresher, a plurality of rotatable wheels positioned on a balancing axle, said thresher being mounted on the balancing axle; a header connected to said thresher along a cross axis, said header comprising an inclined body and a platform and a three-dimensional pivotable means connecting said platform to said inclined body, said platform being connected with the balancing axle of said rotatable wheels; said three-dimensional pivotable means comprising a compact spherical joint, at least one means for balancing said platform on the inclined body, and at least one limiter for precluding lateral turning of the platform in a horizontal plane.

3. A hillside combine harvester as claimed in claim 2, wherein said spherical joint comprises a mounting fastened to the platform and a ball element mounted on the inclined body 4. A hillside combine harvester as claimed in claim 2, wherein said balancing means is positioned adjacent to said inclined body and comprises at least one adjustable resilient element secured at the upper end of the inclined body, a three-armed lever pivotally mounted at the lower end of the inclined body, and a link connected to said platform; said three-armed lever being connected to said link and said resilient element.

5. A hillside combine harvester as claimed in claim 2, wherein said limiter comprises a first portion including at least one roller fastened on the header, and a second portion comprising a guide with a vertical groove on said body, in which groove said roller is disposed.

6. A hillside combine harvester, comprising a thresher, a plurality of rotatable wheels positioned on a balancing axle, said thresher being mounted on the balancing axle; a header connected to said thresher along a cross-axis; said header comprising an inclined body and a platform, three-dimensional pivotable means interconnecting said platform and inclined body; said platform being connected with the balancing axle of said rotatable wheels; said pivotable interconnecting means including means for maintaining said platform parallel to the hillside in a transport position and on the field surface, in an operative working position.

7. A hillside combine harvester as claimed in claim 6, wherein the pivotable interconnecting means comprise at least one bracket having a shaped groove, said bracket being mounted on the balancing axle, and at least one lever having a roller, and said lever being mounted on the platform, said roller being movable in the shaped groove of said bracket.

8. A hillside combine harvester comprising a thresher, a plurality of rotatable wheels positioned on a balancing axle, said thresher being supported on the balancing axle; a header connected to said thresher along a cross-axis; said header comprising an inclined body and a platform; a three-dimensional pivotable means interconnecting said inclined body and platform so as to ensure the turning of said platform relative to said inclined body in longitudinal and transverse directions; said inclined body comprising a conveyor having a drive shaft located on the turning axis of said header; said pivotable interconnecting means maintaining said platform parallel to the hillside in transport position and enabling it to turn in an operative working position relative to the inclined body in the longitudinal and transverse directions; operative members on said header; a drive for the operative members of the header, said drive comprising a first conical reducing gear means mounted on the conveyor drive shaft; a second conical reducing gear means mounted on the platform adapted to operatively engage said first gear; said gears having output shafts; and a telescopic universal joint connecting the output shafts of said reducing gears.

* * * * *